United States Patent [19]

Stephens

[11] 4,139,382

[45] Feb. 13, 1979

[54] PHOTOGRAPHIC SOUND REPRODUCTION USING SILVER DIFFUSION TRANSFER

[75] Inventor: Robert K. Stephens, Windham, N.H.

[73] Assignee: Polaroid Corporation, Cambridge, Mass.

[21] Appl. No.: 864,596

[22] Filed: Dec. 27, 1977

[51] Int. Cl.² .......... G03C 7/24; G03C 7/00; G03C 5/14; G11B 7/24

[52] U.S. Cl. .......... 96/3; 96/4; 96/29 R; 96/39; 96/76 R; 274/5 R; 274/41.6 R; 274/41.6 PP; 352/26; 352/27

[58] Field of Search .......... 96/3, 4, 29 R, 39, 76 R; 274/5 R, 41.6 R, 41.6 PP; 352/26, 27

[56] References Cited

U.S. PATENT DOCUMENTS

| | | | |
|---|---|---|---|
| 2,861,885 | 11/1958 | Land | 96/29 R |
| 3,536,488 | 10/1970 | Land | 96/29 R |
| 3,615,426 | 10/1971 | Debruyn | 96/29 R |
| 3,615,427 | 10/1971 | Debruyn | 96/29 R |
| 3,615,428 | 10/1971 | Weed | 96/29 R |
| 3,615,429 | 10/1971 | Weed | 96/29 R |
| 3,677,753 | 7/1972 | Francis et al. | 96/29 R |
| 3,894,871 | 7/1975 | Land | 96/29 R |

OTHER PUBLICATIONS

Glafkieles, P., *Photographic Chemistry,* Foundation Press, London, 1958, pp. 261-265.

*Primary Examiner*—Richard L. Schilling
*Attorney, Agent, or Firm*—Philip G. Kiely

[57] ABSTRACT

A photographic sound recording and reproduction method is disclosed wherein a sound track is formed by silver diffusion transfer processing. Film units suitable for this application are described which comprise a support, a layer containing silver precipitating nuclei, and a layer containing photosensitive silver halide crystals.

In one embodiment, a photographic sound track may be produced in a silver diffusion transfer color motion picture film unit, which further comprises an optical color screen.

16 Claims, 3 Drawing Figures

PHOTOGRAPHIC SOUND REPRODUCTION USING SILVER DIFFUSION TRANSFER

BACKGROUND OF THE INVENTION

1. Field of the Invention

This invention relates to sound recording and reproduction by photographic means. More particularly, this invention relates to methods, articles and systems for the reproduction of sound in connection with motion pictures.

2. Description of the Prior Art

The general principle of sound recording by photographic means is old and involves exposing a photographic film to illumination controlled by the sound signals to be recorded. After the latent image thus formed on the film is developed into a projectable image, the light transmission properties of the developed film vary in sympathy with the amplitude and frequency of the sound waves. These variations in the light-transmitting properties of the film may be accomplished in a variety of ways, but it is most commonly accomplished by rendering a continually varying area of the film opaque, known as variable-area photographic recording, or by continually varying its density with respect to light transmission, known as variable-density photographic recording. In either case, the varying image produced on the film by the sound-modulated illumination is known as a "sound track," and the frequency and intensity of the variation is a function of the frequency and amplitude of the sound represented thereby.

Generally speaking, the well-known principles of sound reproduction by means of such film involve the combination of four essential elements, namely, a constant intensity light beam, some photoelectric means, means for varying the intensity of the beam predeterminately with respect to both frequency and degree, and sound reproducing means so coupled with the photoelectric means that variations of the intensity of light incident on the latter will be converted into sound. The means for varying the intensity of the light beam is provided by the above-described sound track of the film itself, which is moved continuously across the path of the beam and, as described above, thereby transmits a rapidly varying amount of the light therefrom. The output from the photocell, and therefore to the sound-reproducing means, depends on how much light falls on it and this, in turn, is controlled by the sound track on the film.

To date, processing of photographic sound recordings has been essentially similar to conventional picture materials, i.e., development of the negative image, removal of unexposed silver, from the negative exposure by a separate light source to print a positive from the negative and subsequent development and processing of the positive to bleach out the exposed silver. This procedure is time-consuming and complicated especially when the use of various dyes are involved for color film processing.

The control of temperature and composition of the developing solution have a great influence on the constancy of sound track development. Furthermore, inefficient agitation can produce distortion due to local accumulation of by-products in the region separating the clear and dense areas. When prints are made, care must be taken to obtain the proper exposure of the positive through the negative, not only as to time and intensity of light but, in the more common variable-area recording, also in terms of geometric shape of the image. Also, the shrinkage of the negative (which is not constant) must be considered. Shrinkage can vary between 0 and 1% and the slip of the negative over the unexposed positive can result in more or less pronounced distortions in sound reproduction. The effect of this shrinkage usually has been overcome by using non-slip printers in which the films only touch each other at the exposure point.

The photographic method of sound recording and reproduction has found its widest use in providing sound tracks for cinematographic film, and by far the most common technique for this application is the variable area method of recording. The cinematographic sound track is normally made on a separate negative film and then printed or "striped" alongside the picture images in what is called a "married print". The continual movement necessary for the reproduction process described hereinbefore is accomplished by the film movement through the projector.

In the production of color motion pictures, some difficulty has been encountered in producing satisfactory photographic sound tracks. Methods in the prior art generally involve processing or otherwise treating the photographic sound track portion of the motion picture film separately from the picture area, thus resulting in various complex and time-consuming procedures which decrease the desirability of photographic sound track systems over alternative methods, notably magnetic tape systems. For a further discussion concerning the development of sound recordings, see: Glafkides, P.; *Photographic Chemisty;* Foundation Press; London (1958) pps. 261–265.

For the above cited reasons, it would be highly desirable if the time advantages and simplicity associated with silver diffusion transfer processing could be employed in the processing of photographic sound recordings and cinematographic sound films.

Several integral silver diffusion transfer film units, essentially comprising a fixed laminate which includes a support carrying on one surface thereof a layer containing photosensitive silver halide crystals and a layer containing silver precipitating nuclei, are disclosed and claimed in several U.S. patents, including the following:

| U.S. Pat. No. | Issue Date |
|---|---|
| 2,861,885 | 11/25/58 |
| 3,536,488 | 10/27/70 |
| 3,615,426 | 10/26/71 |
| 3,615,427 | 10/26/71 |
| 3,615,428 | 10/26/71 |
| 3,615,429 | 10/26/71 |
| 3,677,753 | 7/18/72 |
| 3,894,871 | 7/15/75 |

The above indicated film units are particularly suited for employment as a cinematographic film for motion picture projection, since a positive image is provided in black and white, and, where the film units also include optical screen elements, in color, with simple and effective processing employing relatively simple and stable processing compositions immediately subsequent to exposure. Such a film unit is suitably employed in a motion picture system such as that described in U.S. Pat. No. 3,615,127, issued Oct. 26, 1971 which comprises a compact motion picture cassette capable of performing the functions of exposing a photosensitive film contained therein and subsequently processing the film by applying thereon a developing composition to develop the recorded images and also projecting the images or otherwise presenting them for viewing purposes.

SUMMARY OF THE INVENTION

In accordance with this invention a film unit such as those described above, which provide a positive projection image by diffusion transfer processing, is employed in a conventional sound recording and reproduction system.

The film unit employed in the present invention essentially comprises a support having disposed on one surface thereof a plurality of layers including a layer comprising silver precipitating nuclei and a layer comprising photosensitive silver halide. A preferable film unit comprises a permanently fixed laminate which remains intact after processing and possesses a transparent support and silver halide crystals dispersed in a polymeric binder which is permeable to the processing composition used. One embodiment of the present invention involves an integral silver diffusion transfer motion picture film assemblage of the type described, further comprising an optical screen element possessing, fixedly positioned in contiguous relationship to one surface, panchromatically sensitized photoresponsive material directly providing positive color photographic image reproduction in accordance with the principles of additive color photography while simultaneously providing a sound track in accordance with the principles of photographic sound recording and reproduction.

According to the present invention, a sound pattern may be reproduced by utilizing sound-modulated white light. In a particularly preferred embodiment, a cinematographic film unit of the type described above comprising an optical filter screen containing, for example, sets of red, green and blue filter elements, may incorporate a sound track behind the filter elements thereof, produced by sound modulated white light exposure, and, upon processing, be employed in a photographic sound reproduction system to provide modulating beams of white light which are ultimately converted to reproduce the original sound.

Thus, the practice of the present invention in its preferred embodiment allows the operator not only to obtain instant color motion pictures but further incorporates the ability to record and project a sound track to supplement said pictures without the aforementioned problems associated with prior art techniques.

DETAILED DESCRIPTION OF THE INVENTION

Figure 1:
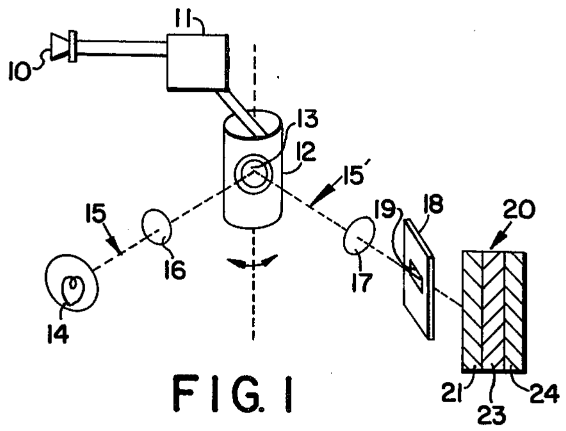
FIG. 1 is a diagrammatic representation of a photographic sound-recording system embodying a form of the film unit of the invention shown in cross-section.

Referring first to FIG. 1, element 20 is a relatively continuous strip of film suited for the practice of the present invention and is shown as an integral part of a variable area photographic sound recording system well-known to the art. In a typically basic system of this type, a constant beam of light 15 from lamp 14, fed by a D.C. supply (not shown), is focused by condenser lens 16 onto mirror 13 in galvanometer 12. Light reflected by mirror 13 will sweep through an angle proportional to the current passing through galvanometer 12, and, since that current is derived from microphone 10, via amplifier 11, the oscillations of reflected light beam 15' will be proportional to the fluctuating sound waves to which this microphone is exposed. As mirror 13 oscillates, due to these fluctuating currents, lens 17 focuses the motion of light beam 15' down to a fine spot. This spot oscillates across slit 19, cut in mask 18 behind which film unit 20 is travelling at a constant speed in a direction perpendicular to the plane of the light beam 15'.

It should be understood that there are systems in the art other than the above-described "variable-area" system by which sound may be recorded photographically as a varying parameter on a film unit and which are suitable for the practice of the instant invention. The fundamental requirements for such a suitable system is that the frequency of the sound be represented by the number of changes in the record which pass a given point in a period of time, and that the volume of the sound be proportional to the size of the changes in the record. The most common alternative system involves a form of light-valve which produces a track of constant width but varying image density, appropriately referred to as the "variable-density" system of sound recording. Although the detailed description contained hereinafter is set forth solely in conjunction with the principles of variable area photographic recording and reproduction, the alternative employment of other such systems is included within the scope of the present invention.

As described in part hereinbefore, the film unit with its characteristic varying exposure record (a sound track) is ultimately processed into a projectable image and may be subsequently employed to duplicate the sounds which originally modulated this exposure via a photographic sound reproduction system, such as set forth in FIG. 2.

Figure 2:
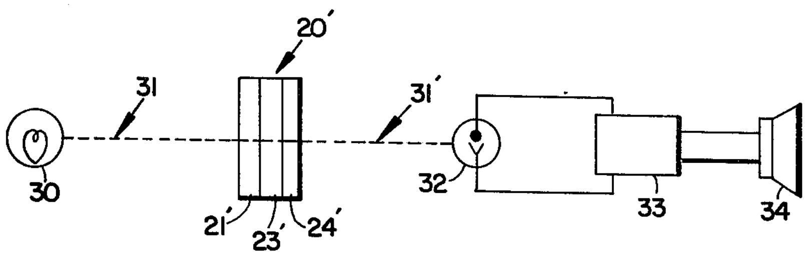
FIG. 2 is a diagrammatic representation of a photographic sound-reproduction system suitable for use with the film unit shown in FIG. 1 after processing.

Referring now to FIG. 2 the film unit 20', processed in a manner described in detail hereinafter, is considered as moving continuously in a direction perpendicular to the plane of the light beam 31, and any conventional mechanism may be provided for controlling the movement thereof. As said film unit 20' moves across the path of constant intensity light beam 31, incident on photocell 32, the continuous variations in the intensity of transmitted beam 31', which variations are produced by the image of the sound track, causes corresponding variations of the current output of photocell 32, and these variations in current are converted via amplifier 33 into sound waves emitted from speaker 34, to duplicate the original, recorded sound waves. The frequency of the fluctuations in the light transmitted determines the frequency of the sound, and the extent or degree of these fluctuations determines its amplitude or intensity. As with the sound recording system described hereinbefore, many modifications obvious to those skilled in the art may be made of the above basic sound-reproduction system without departing from the scope of the present invention.

Returning briefly to FIG. 1, film unit 20 illustrates, in a diagrammatic cross-sectional view whose thickness is highly exaggerated for purposes of clarity, the association of elements constituting one embodiment of the film unit employed in the present invention, and comprises a transparent support 21, on one surface of which is disposed a substantially photoinsensitive layer 23 containing minute silver precipitating nuclei and a photosensitive layer 24 containing silver halide crystals.

Film units such as described above and the silver diffusion transfer processing thereof are disclosed in detail in the U.S. patents identified hereinbefore. These patents are herein incorporated by reference in their entirety.

Essentially as discussed in the above-indicated patents, a positive silver image is provided in film unit 20 by silver diffusion transfer processing. Specifically, a latent image, provided in photosensitive emulsion layer 24 by exposure of the silver halide crystals therein to modulating light beam 15', is developed by a silver halide developing agent, and, substantially contemporaneous with such development, a soluble complex is obtained by reaction of a silver halide solvent with unexposed and undeveloped silver halide of the emulsion. The resultant soluble silver complex is transported, at least in part, to the silver precipitating nuclei containing layer 23, and the silver of the complex precipitated in said layer to provide the requisite silver image that defines the sound track.

In general, the silver precipitating nuclei of layer 23 comprise a specific class of adjuncts well known to the art, e.g. those disclosed in U.S. Pat. No. 2,698,237, and are adapted to effect precipitation of solubilized silver halide, specifically including heavy metals and heavy metal compounds and noble metals, and may be effectively employed in the conventional concentrations traditionally employed in the art, preferably in a relatively low concentration in the order of about 1–25 $\times 10^{-6}$ moles/ft.$^2$.

The photoresponsive material of layer 24 will, as previously stated, preferably comprise a crystal of a compound of silver, for example, one or more of the silver halides, such as photosensitive silver chloride, silver iodide, silver bromide, or most preferably, mixed silver halides, such as silver chlorobromide or silver iodobromide, varying halide ratios and silver concentrations, and are most preferably dispersed in a processing composition permeable binder material, all according to procedures well-known in the photographic art.

For advantageous sound recording and reproduction, the photographic emulsion chosen will preferably possess a grain size, for example, on the order of 0.5 $\mu$ to 0.9 $\mu$ and relatively high resolving power. As examples of the preferred sensitometric characteristics of a photographic emulsion contemplated for employment in a variable area method of recording and reproduction, mention may be made of a characteristic (H + D) curve with a well-defined straight-line portion and very short toe; a relatively high positive transfer density, for example, on the order of 2.0 to 3.5; and a relatively high positive gamma, for example, about 2.0 to 2.6.

The processing compositions employed are well known in the art and comprise aqueous alkaline compositions including silver halide developing agents, such as, for example, a hydroquinone, and silver halide solvents, such as for example, sodium thiosulfate, and possible other components such as restrainers, accelerators, and the like. The processing compositions may be applied to the film by a variety of methods such as, for example, doctor blades extrusion heads, capillary applicators, wicks, and the like. However, the amount of processing composition applied to the film unit must be controlled within relatively narrow limits, that is, sufficient processing composition must be applied to adequately and completely permeate the film unit to the depth necessary to provide the desired negative and positive images, all as taught in the art, for example, the aforementioned U.S. patents.

Referring now to FIG. 2, the processed film unit 20' comprises layer 24' containing a negative silver image in terms of exposed areas of the silver halide layer and, superposed thereon, layer 23' containing a positive silver image in terms of unexposed areas of the silver halide layer. The film unit 20' illustrates a preferred form of the above-described film unit comprising a permanently fixed laminate which remains intact after processing and a transparent support 21 preferably made from a flexible polymeric material, so that the resultant positive silver transfer image may be viewed as a transparency.

The silver precipitating nuclei of film unit 20' are preferably present in a concentration effective to provide a silver image to the film unit possessing optical density inversely proportional to exposure of the photosensitive silver halide layer, and specifically, in a concentration adapted to provide a silver image derived from unexposed silver halide crystals possessing greater covering power, and therefore greater optical density per unit mass than that of the corresponding silver image derived from exposed silver halide crystals. The silver halide crystals as stated before are preferably dispersed in a polymeric binder material which is permeable to the processing composition employed.

Film units of the type described are disclosed in the above-indicated patents which are made suitable for color photographic reproduction by the addition of an optical screen element, preferably disposed intermediate the support and the silver precipitating nuclei containing layer, wherein said screen element possesses filter media which selectively transmit predetermined portions of the electromagnetic radiation spectrum, preferably corresponding to its red, blue and green visible regions. Color information recordation is accomplished by point-to-point incidence of radiation actinic to the selected photoresponsive material as modulated by such screen element and visual reproduction of the color information recorded thereby is accomplished by viewing the resultant image, after processing, through the same or similar screen element in appropriate registration with the image.

Figure 3:
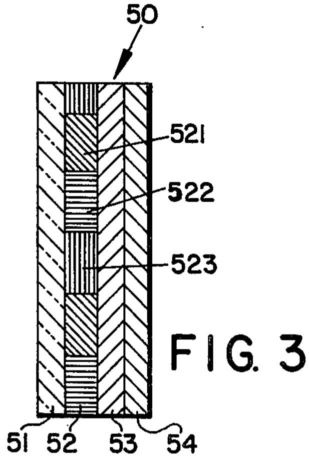
FIG. 3 is a diagrammatic cross-sectional view of a preferred film unit within the scope of the present invention.

A particularly preferred film unit 50 of the above described type is shown in FIG. 3. The integral silver diffusion transfer film unit 50 comprises a transparent support 51 having in contiguous superposed relation to one surface thereof an optical filter screen element 52 comprising a plurality of repeating sets of triplets comprising a green optical filter 521, a blue optical filter 522 and a red optical filter 523; as well as a substantially photoinsensitive layer 53 comprising silver precipitating nuclei and a photosensitive silver halide layer 54, as described hereinbefore.

As stated briefly before, the silver halide crystals are most preferably dispersed in a processing composition permeable binder material so that said development and transportation may be carried out effectively with the layers of the film unit remaining intact. The preferred binder material for the photoresponsive material is gelatin, or alternatively said gelatin may be replaced, in whole or in part, with some other material and/or synthetic processing composition permeable polymeric material such as albumin, casein, zein or resins such as cellulose derivatives or vinyl polymers.

Additionally enhancing, to a maximum extent, efficient positive image silver formation and, accordingly, acuity of the composite image formation, is the close spacial proximity of the selectively photoexposed silver halide crystals of photosensitive layer 54' next adjacent the major surface boundaries of the photoinsensitive silver precipitating nuclei containing layer 53' of the preferred film unit 50'. The silver precipitating nuclei containing layer 53 also preferably possesses a thickness of less than about a wavelength of light thus minimizing any possible optical parallax problems during radiation transmission.

The resolution and image acuity described above are particularly advantageous in connection with photographic sound recording and reproduction since the parameters related to any photographic sound process must remain between limits considerably closer than those acceptable in pictures. Deficiencies in resolution may be permitted in a positive picture image before the eye rejects them, yet small departures from correct sound tone balance in photographic sound recordings would ultimately result in distortions in reproductions which the ear can immediately detect.

The present invention will now be illustrated in greater detail in conjunction with the following specific example which sets forth a representative embodiment which is not limited to the detailed description herein set forth but is intended to be illustrative only.

A film having a trichromatic additive color screen may be prepared by the process set forth in U.S. Pat. No. 3,284,208 which includes, in essence, successively coating the smooth surface of a lenticular film with a plurality of photoresponsive layers and suquentially subjecting the coatings to selectively displaced radiation incident on, and focused by, the lenticules receiving same, in order to provide selective exposure of the coating. Subsequent to each exposure, unexposed coating is removed and the resultant resist dyed in order to provide a series of chromatic filter elements, prior to the deposition of the next succeeding photoresponsive layer. Each such exposure is derived from electromagnetic radiation incident on the lenticular film at an angular displacement specifically adapted to provide the desired plurality of chromatic filter element series in substantial side-by-side or screen relationship and adapted to filter predetermined wavelenths of light.

Subsequent to formation of the color screen, the lenticules are removed and the external surface of color screen may be coated with a composition comprising deacetylated chitin and copper sulfide at a coverage of, for example, about 4.4 mgs./ft.$^2$ deacetylated chitin and 0.25 mgs./ft.$^2$ copper sulfide. On the external surface of the preceding layer a gelatino silver iodobromide emulsion preferably unhardened may then be coated at a coverage of, for example, about 200 mgs./ft.$^2$ gelatin, 100 mgs./ft.$^2$ silver and 4.0 mgs./ft.$^2$ algin. Intermediate the chitin layer and the emulsion layer may be coated an alkali soluble stripping layer of, for example, poly (methacrylic/acrylic acid) copolymer, or cellulose acetate hydrogen phthalate.

The gelatino silver halide emulsion employed may be prepared by any of the known methods directed to providing a photographic emulsion having the preferable sensitometric characteristics outlined hereinbefore, for example, as described in the aforementioned U.S. patents. A typical method is set forth below:

A mixture is heated comprising 80 grams of gelatin in 880 grams of water at a temperature of about 40° C. for the period required to dissolve the gelatin. The pH of the resultant solution is adjusted to 10±0.1 and 8.8 grams of phthalic anhydride in 61.6 cc. of acetone is added to the solution over a period of 30 minutes. Subsequent to addition of the phthalic anhydride, the reaction mixture is maintained at the stated temperature and pH for a period of about 30 minutes and then adjusted to a final pH of about 6.0. To a solution comprising 226 grams of the gelatin phthalic anhydride derivative, 161 grams of potassium bromide, 2 grams of potassium iodide, and 1200 grams of water are added to a solution comprising 200 grams of silver nitrate in 1600 grams of water, at a rate of about 140 cc. per minute, for a period of about 3 minutes, held 10 minutes and the addition continued for a period of about 9 minutes. The resulting emulsion is then precipitated by reducing the pH to about 2.5–3.0 with sulfuric acid. The precipitate is then separated from the supernatant liquid and washed until the wash water is essentially free of excess potassium bromide. Ninety-five grams of gelatin is then added to the precipitate, the volume adjusted with water to 845 cc., and dissolved by heating to about 38° C. for about 20 minutes, at a pH of about 5–6, and about 1.0 cc. of IN potassium bromide added to the emulsion. To the reaction mixture, at about 56° C., are added about 5 cc. of a solution containing 0.1 grams of ammonium thiocyanate in 9.9 cc. of water and 0.4 cc. of a solution containing 0.097 grams of gold chloride in 9.9 cc. of water, and the mixture ripened at that temperature for about 37 hours.

The resultant emulsion is then panchromatically sensitized by the sequential addition of, for example, 0.1% by weight, methanol solutions of anhydro-5,5'-diphenyl-3,3'-bis-(4-sulfobutyl)-9-ethyl-oxacarbocyanine hydroxide and anhydro-5,5'-dimethyl-3,3'-bis-(3-sulfopropyl)-9-ethyl-thiacarbocyanine hydroxide in optically effective concentrations. The copper sulfide silver precipitating agent may be provided, prior to coating, by the in situ addition of substantially equimolar quantities of copper acetate and sodium sulfide solutions.

The film unit, fabricated as detailed above and taking the form of a 16 mm motion picture film strip with perforations along one side thereof for engagement with conventional motion picture drive means, may then be exposed to a scene through its base by employing an Auricon Pro 600 optical sound camera. A single variable area sound track may be provided on the edge of the film unit opposite the perforations by employing a single microphone to receive the sounds accompanying the scene. The excitor lamp is preferably adjusted so as to match the photographic speed of the film (e.g. ASA 16).

The film unit was then developed by contacting it for about 2 seconds with a processing composition comprising, for example, 180 cc. of water, 8.33 grams of sodium hydroxide, 16 grams of sodium thiosulfate, 6.48 grams of sodium sulfite, 0.42 grams of 6-nitrobenzimidazole, and 5 grams of 2,6-dimethylhydroquinone, to provide production of a positive silver image in the chitin layer.

The silver emulsion layer was then removed leaving substantially no residue on the film unit by, for example, washing off the emulsion layer with water or contacting the emulsion layer with a gelatin covered roller.

The processed film unit was then employed to reproduce sound in a 16 mm optical sound projector, e.g. as manufactured by Bell and Howell.

Since certain changes may be made in the above-described method, system and product without departing from the scope of the invention herein involved, it is intended that all matter contained in the above description shall be interpreted as illustrative and not in a limiting sense.

What is claimed is:

1. A method for photographically recording and reproducing sound which comprises:
   - modulating illumination in sympathy with the frequency and amplitude of a pattern of sound waves;
   - moving across the path of said modulated illumination a film unit comprising a transparent support having disposed on one surface thereof a plurality of layers including a layer comprising silver precipitating nuclei and a layer comprising photosensitive silver halide, to expose said photosensitive silver halide to said illumination and form therein a latent image defining a sound track;
   - contacting said photosensitive silver halide of said film unit with an aqueous processing composition containing a silver halide developing agent to develop said latent image and a silver halide solvent to react with unexposed and undeveloped silver halide to obtain a soluble silver complex which is transported by diffusion transfer to said silver precipitating nuclei containing layer where the silver of said complex is precipitated in said layer to provide a positive silver projection image defining said sound track; and
   - moving said positive silver projection image across the path of a constant intensity beam of light to vary the intensity of said beam of light incident on photoelectric means coupled with sound-reproduction means to thereby reproduce said pattern of sound waves.

2. The method of claim 1 wherein said illumination comprises the white portion of the electromagnetic spectrum and said silver halide is panchromatically sensitized.

3. The method of claim 1 wherein said layers remain intact subsequent to processing, said film unit comprising a permanently fixed laminate and said silver halide is dispersed in a polymeric binder which is permeable to said processing composition.

4. The method of claim 2 wherein said film unit includes an additive color screen comprising red, green and blue optical filter elements, said additive color screen being disposed next adjacent said support wherein said method further includes imagewise exposure of a longitudinal section of said film unit parallel to said sound track to provide thereby a plurality of images together defining a motion picture.

5. The method of claim 1 which includes imagewise exposure of a longitudinal section of said film unit parallel to said sound track to provide thereby a plurality of images together defining a motion picture.

6. In a sound recording and reproduction system of the type including a movable film unit adapted to have thereon an image of a sound track derived from exposure to illumination modulated by sound waves to be reproduced, said image after development being used for varying the intensity of a constant intensity beam of light with respect to both frequency and degree; and sound reproduction means so coupled with photoelectric means that the variations of the intensity and frequency of said beam of light incident thereon are converted into sound; said film unit comprising:
   - a transparent support;
   - a photosensitive silver halide layer on one surface of said support; and
   - a substantially photoinsensitive layer intermediate said photosensitive layer and said support and containing silver precipitating nuclei;
   - said film unit adapted to provide in said silver precipitating nuclei containing layer after silver diffusion transfer processing a silver projection image defining said sound track in terms of unexposed areas of said photosensitive silver halide layer.

7. The system of claim 6 wherein said sound track is a variable area sound track.

8. The system of claim 6 wherein said film unit further comprises a longitudinal section parallel to said sound track adapted to carry thereon a plurality of images together defining a motion picture.

9. The system of claim 6 wherein said film unit is a permanently fixed laminate and said silver halide is dispersed in a polymeric binder material which is permeable to the processing composition used for silver diffusion transfer processing, said laminate adapted to remain intact subsequent to said processing.

10. The system of claim 6 wherein said film unit further comprises:
   - an additive color screen comprising red, green and blue optical filter elements, next adjacent said support.

11. The system of claim 10 wherein said film unit is a permanently fixed laminate adapted to remain intact after processing and constituting a color motion picture sound film having red, green and blue color optical filter elements in said color screen, said silver halide crystals being dispersed in a processing composition permeable binder and said sound track being disposed on a first longitudinal section of predetermined width parallel to a second section adapted to carry thereon a plurality of images defining said motion picture, said sound track adapted to comprise an exposure recording having a segmented portion behind said optical filter elements corresponding to the sound-modulated variations of light.

12. In a sound recording and reproduction system of the type including a moving film unit having thereon an image of a sound track derived from exposure to illumination modulated by sound waves to be reproduced, said image being used for varying the intensity of a constant intensity beam of light with respect to both frequency and degree; and sound reproduction means so coupled with photoelectric means that the variations of the intensity and frequency of said beam of light incident thereon are converted into sound; said film unit comprising:
   - a transparent support;
   - an exposed and processed silver halide layer on one surface of said support; and
   - a substantially photoinsensitive layer intermediate said silver halide layer and said support and containing a silver precipitating nuclei;
   - said film unit providing in said silver precipitating nuclei containing layer after silver diffusion transfer processing a silver projection image defining said sound track in terms of unexposed areas of said photosensitive silver halide layer.

13. The system of claim 12 wherein said sound track is a variable area sound track.

14. The system of claim 12 wherein said film unit further comprises a longitudinal section parallel to said sound track bearing thereon a plurality of images together defining a motion picture.

15. The system of claim 12 wherein said film unit is a permanently fixed laminate.

16. The system of claim 12 wherein said support is transparent and said film unit further comprises:

an additive color screen comprising red, green and blue optical filter elements, next adjacent said support.

* * * * *